United States Patent [19]

Flagge

[11] 4,123,358
[45] Oct. 31, 1978

[54] SEPTIC SYSTEM LIQUID LEVEL CONTROL APPARATUS

[76] Inventor: Bruce Flagge, 107 Dogwood Court Dr., Yorktown, Va. 23490

[21] Appl. No.: 819,030

[22] Filed: Jul. 25, 1977

[51] Int. Cl.² .............................................. C02C 1/02
[52] U.S. Cl. .................................... 210/104; 210/172; 210/532 S
[58] Field of Search .................. 210/103, 104, 257 R, 210/170, 172, 532 S

[56] References Cited

U.S. PATENT DOCUMENTS

| | | | |
|---|---|---|---|
| 3,572,506 | 3/1971 | Bandy, Jr. et al. | 210/170 X |
| 3,655,051 | 4/1972 | Quase | 210/170 X |
| 3,674,687 | 7/1972 | Quase | 210/170 X |
| 4,042,497 | 8/1977 | Maltby | 210/104 X |

*Primary Examiner*—John Adee

*Attorney, Agent, or Firm*—Howard J. Osborn; John R. Manning; Wallace J. Nelson

[57] ABSTRACT

Automatic liquid volume compensation apparatus is disclosed having particular application to septic systems. The apparatus limits septic tank air volume to optimize bacterial decomposition of wastes and controls the flow rate from the inlet piping through the tank to the drain field to limit passage of unprocessed fluid and prevent backups in the inlet piping.

In the first of two embodiments, a bladder within a settling tank inflates or deflates to accommodate changes in liquid volume while maintaining tank level within desired limits. In the second embodiment, an auxiliary tank stores excess liquid which is returned to the primary settling tank when settling tank liquid level has declined to a desired height.

10 Claims, 3 Drawing Figures

SEPTIC SYSTEM LIQUID LEVEL CONTROL APPARATUS

ORIGIN OF THE INVENTION

The invention described herein was made by an employee of the U.S. Government and may be manufactured and used by or for the Government for Governmental purposes without the payment of any royalties thereon or therefor.

BACKGROUND OF THE INVENTION

This invention relates generally to fluid handling apparatus capable of self proportioning and more specifically to liquid purification or separation apparatus having this capability. It has particular application to septic systems.

Septic systems, while having limited use in municipal treatment, are the primary devices for treatment of sewage from individual residences. Generally, residential septic systems consist of a drain line, a settling tank and a drain field. Sewage introduced into the settling tank through the drain line undergoes sedimentation of suspended solids and bacterial decomposition of waste products. The sewage is thereafter communicated to a drain field for dispersal of the effluent over a land area sufficient to allow absorption of the liquid into the ground.

Where the rate of inlet flow through the drain line exceeds the processing capacity of a conventional septic system, several undesirable results may occur. The time being insufficient for sedimentation and decomposition to take place, the settling tank discharges unprocessed sewage into the drain field. Should the drain field be unable to absorb the liquid, surface seepage results having an objectionable odor and carrying pathogenic bacteria. In addition, where the inlet flow rate of sewage through the drain line exceeds the absorption rate of the drain fields, the liquid level in the settling tank can rise above the drain line opening. This causes back pressure and results in solids settling out in the drain line thereby clogging the inlet and blocking off further waste disposal.

Prior solutions have depended on increasing the size of the septic tank or drain field. Lack of available space or poor soil absorbency often make this impractical however.

It is therefore an object of the present invention to provide apparatus for a sewage system which compensates for a sewage inlet flow greater than the rate of absorption of the drain field.

It is another object of the present invention to provide increased sewage system capacity without increasing the size of the septic tank.

It is an additional object of the present invention to accept unprocessed sewage when the absorption rate of the drain field is less than the inlet flow rate of sewage, process the sewage when the sewage system load is sufficiently low to allow it, and discharge the processed liquid through the drain fields when the absorption rate of the drain field is greater than the inlet flow rate.

It is a further object of the present invention to provide additional storage volume when the inlet flow of sewage so demands, and apparatus for the reintroduction of the liquid so stored when the sewage system is better able to process it.

SUMMARY OF THE INVENTION

These and other objects of the present invention are achieved by providing storage capacity beyond the normal processing volume of a conventional settling tank and providing apparatus for the diversion of the flow from the drain field into this storage volume.

The present invention takes advantage of the relationship between the liquid level within the settling tank and the difference between inlet flow and drain field absorption. Where drain field absorbency is less than the sewage system inlet flow rate or a decrease in the absorbency of the drain field, the liquid level in the settling tank will tend to increase. Of course, as the absorbency of the drain field exceeds the inlet flow rate, the liquid level will consequently decrease.

The present invention establishes a fluid level upper limit within the settling tank which, when reached, will cause the diversion of incoming sewage into a storage volume. The liquid is maintained in the storage volume until such time as the settling tank fluid descends to a lower limit whereupon the additional volume of sewage is returned to the system for processing and absorption.

By establishing a fluid level upper limit, back pressure is controlled to prevent the unwanted buildup of solids causing line blockages in the septic system inlet piping. Moreover, the established upper limit controls pressure against the drain field to minimize surface seepage. Conversely, by establishing a fluid level lower limit, the air volume within the septic tank is limited, thus providing a more hospitable environment for the anaerobic bacteria necessary for waste decomposition.

Two embodiments are described herein which provide the desired results. In the first embodiment, the additional storage volume is provided in the settling tank itself. This is accomplished by a deflatable bladder attached to the roof of the settling tank inflated such that it extends into the waste liquid contained therein. By deflating the bladder incrementally as fluid level reaches its upper limit, additional volume is made available for the liquid. By inflating the bladder incrementally as fluid level descends to its lower limit, the fluid is forced from the reserve capacity volume for communication through the drain field.

In the second embodiment, the additional storage volume is provided by an auxiliary tank. By diverting fluid into the auxiliary tank as fluid level reaches its upper limit in the settling tank, additional volume is made available. By returning the stored fluid to the main tank from the auxiliary tank as fluid level descends to its lower level, fluid is returned for processing and communication through the drain field.

A more complete appreciation of the invention and many of the attendant advantages thereof will be readily apparent as the same becomes better understood by reference to the following detailed description when considered in connection with the accompanying drawings.

DETAILED DESCRIPTION

Figure 1:
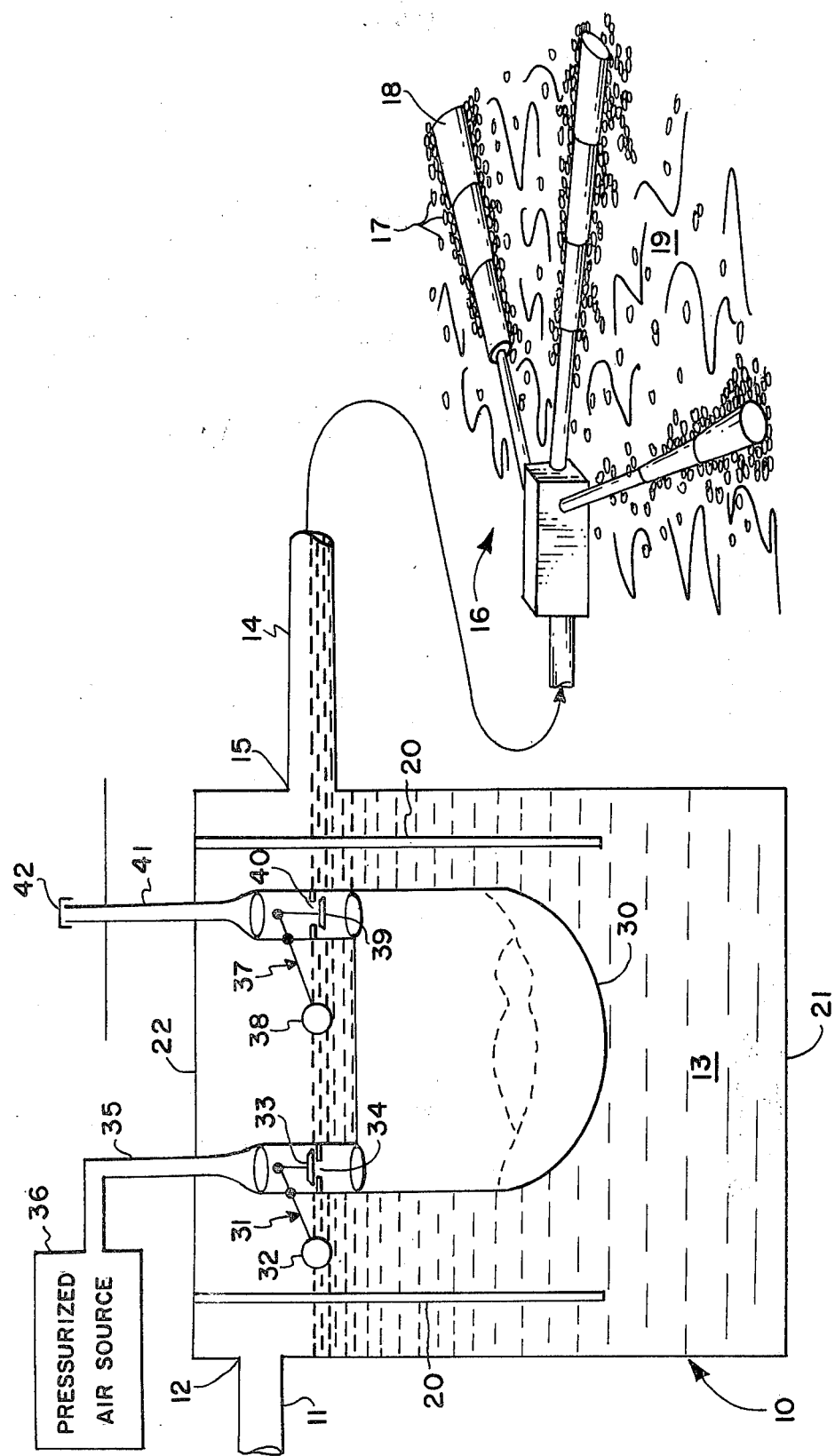
FIG. 1 is a side view of the preferred embodiment of the present invention with the septic tank in cross section.

Referring to FIG. 1, a septic system of the preferred embodiment is shown. A conventional settling tank 10 having the usual shape and made of concrete or other conventional materials is illustrated in cross section. Inlet pipe 11, made of cast iron or other conventional materials, collects sewage products and water and communicates it to inlet orifice 12 where it enters settling tank 10 increasing liquid volume 13. Drain pipe 14, also made of cast iron or other conventional materials, is connected to settling tank 10 through outlet orifice 15 to provide a manifold for communication or processed waste liquid to drain field 16. Drain field 16 consists of gravel or rock 17 covered by ceramic drain tiles 18 which channel waste liquid over a large surface area for absorption into the surrounding soil 19. The height of inlet orifice 12 above floor of settling tank 10 is slightly greater than that of outlet orifice 15 to allow flow through drain pipe 14 unaccompanied by back pressure in inlet pipe 11. In the preferred embodiment, the top of outlet orifice 15 is level with the bottom of inlet orifice 12. Settling tank 10 is further provided with hanging baffles 20 which deflect wastes downward as well as prevent the direct flow of floating waste products from inlet pipe 11 out drain pipe 14.

As shown in FIG. 1, a flexible bladder 30 constructed of a material impermeable by fluids is suspended from settling tank roof 22. A float valve 31 consisting of a ball float 32, gate 33 and seat 34 is located in pressure line 35 connecting bladder 30 to a pressurized air source 36. Float valve 31 is constructed so as to close when liquid level in settling tank 10 rises above a preset level corresponding, in the preferred embodiment to the centerline of outlet orifice 15, and open when liquid level descends below that level. A second float valve 37 consisting of a ball float 38, gate 39 and seat 40 is located in vent line 41 connecting bladder 30 to an above-ground vent 42. Second float valve 37 is constructed so as to open when the liquid in settling tank 10 rises above the previously discussed level and closed when liquid level descends below it.

OPERATION

In operation, bladder 30 is initially inflated to its maximum dimension by float valve 31 remaining open to allow passage of pressurized air from source 36 into bladder 30 while second float valve 37 remains closed thereby preventing the escape of the pressurized air. As waste liquids and sludge are communicated by inlet pipe 11 to settling tank 10, the liquid level therein rises.

In the settling tank 10, sludge settles out while solids are decomposed by anaerobic bacterial action. Once settling tank liquid level has risen to the height of outlet orifice 15, processed liquid is communicated through drain pipe 14 to drain field 16 for absorption into the surrounding soil.

When either the inlet flow rate of waste into settling tank 10 substantially increases or the absorption rate of the drain field substantially decreases, liquid level in the settling tank increases. If either condition persists to such extent that liquid level rises to the center of outlet orifice 15, float valve 31 closes and second float valve 37 opens. Bladder 30 thereby deflates and is displaced by the waste liquid. Bladder 30 will continue to be displaced until liquid level in the tank 10 descends to the center of outlet orifice 15 at which point float valve 31 will close.

Figure 2:
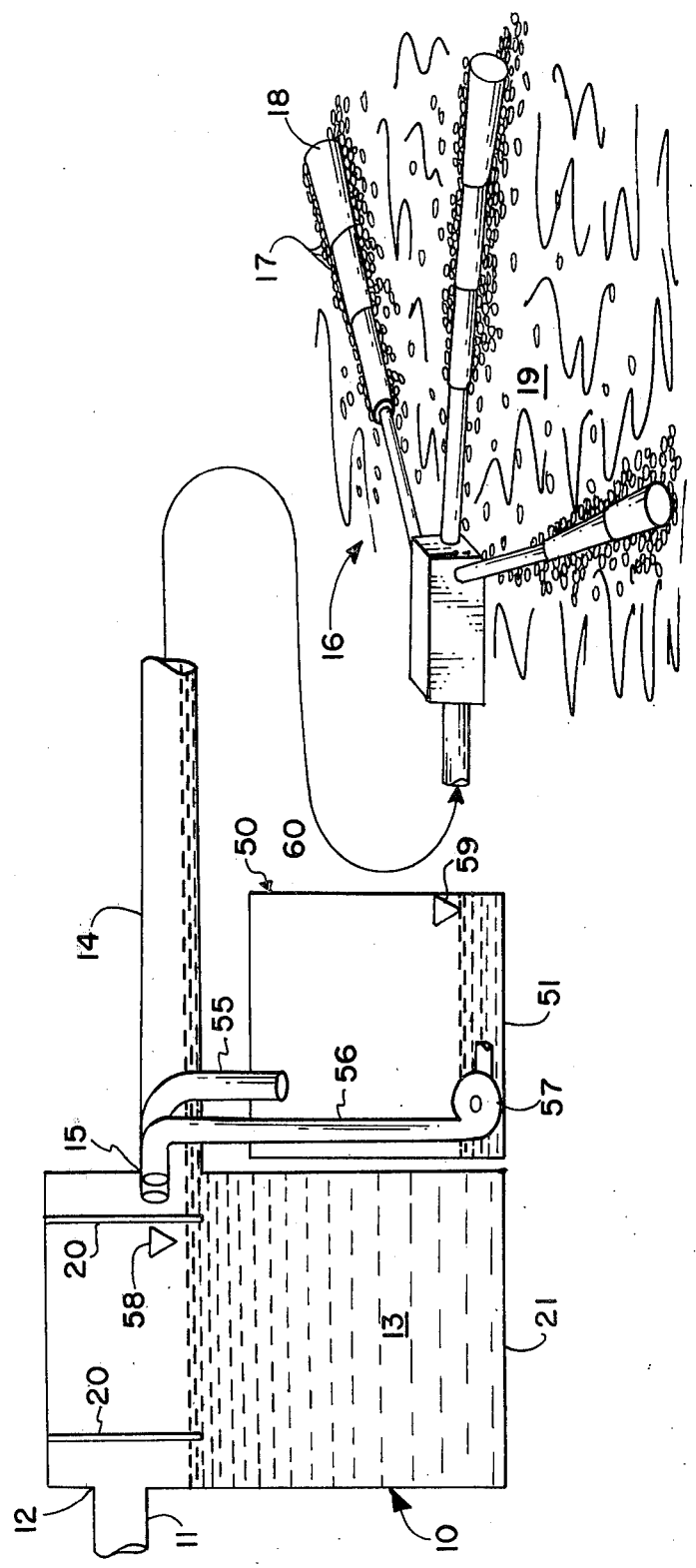
FIG. 2 is a side view cross section of an alternate embodiment of the present invention showing septic tank liquid level in the normal range.

An alternate embodiment to that previously described is shown in FIG. 2. Again, a conventional settling tank 10 having the usual shape and made of concrete or other conventional materials is depicted in cross section. Inlet pipe 11, made of cast iron or other conventional materials collects sewage products and water and communicates it to inlet orifice 12 where it enters settling tank 10 increasing liquid volume 13. Drain pipe 14, also made of cast iron or other conventional materials, is connected to settling tank 10 through outlet orifice 15 to provide a manifold for communication of processed waste liquid to drain field 16. Drain field 16 consists of gravel or rock 17 covered by ceramic drain tiles 18 which channel processed waste liquid over a large surface area for absorption into the soil 19. The height of inlet orifice 12 above floor of settling tank 10 is slightly greater than that of outlet orifice 15 to allow flow through drain pipe 14 unaccompanied by back pressure in inlet pipe 11. The top of outlet orifice 15 is coplanar with the bottom of inlet orifice 12. Settling tank 10 is further provided with hanging baffles 20 which deflect waste downward and prevent the direct flow of floating waste products from inlet pipe 11 out drain pipe 14.

The alternate embodiment differs in the location of the volume provided for excess liquid storage and in the apparatus for removal and return of excess liquid. An auxiliary or storage tank 50 made of concrete or other conventional materials is placed substantially adjacent settling tank 10. Overflow line 55 penetrates settling tank 10 at a level such that waste liquid is diverted into auxiliary tank 50 when liquid level rises above the centerline of drain pipe 14. Return line 56 opens into auxiliary tank 50 adjacent floor 51 and has along its length electrically operated suction pump 57. Return line 56 opens into the settling tank 10 at a level coplanar with overflow line 55.

A settling tank waste level sensor 58 is attached to settling tank 10 in close proximity with overflow line 55 while an auxiliary tank level sensor 59 is attached to wall 60 a predetermined height above floor 51. Sensors 58 and 59 are connected respectively to switches 61 and 62 in pump power line 63, as shown schematically in FIG. 3.

In operation, the alternate embodiment of the present invention allows waste liquid to be diverted into auxiliary tank 50. Once liquid level in settling tank 10 rises above the centerline of outlet orifice 15, overflow line 55 begins to communicate waste liquid to auxiliary tank 50.

Figure 3:
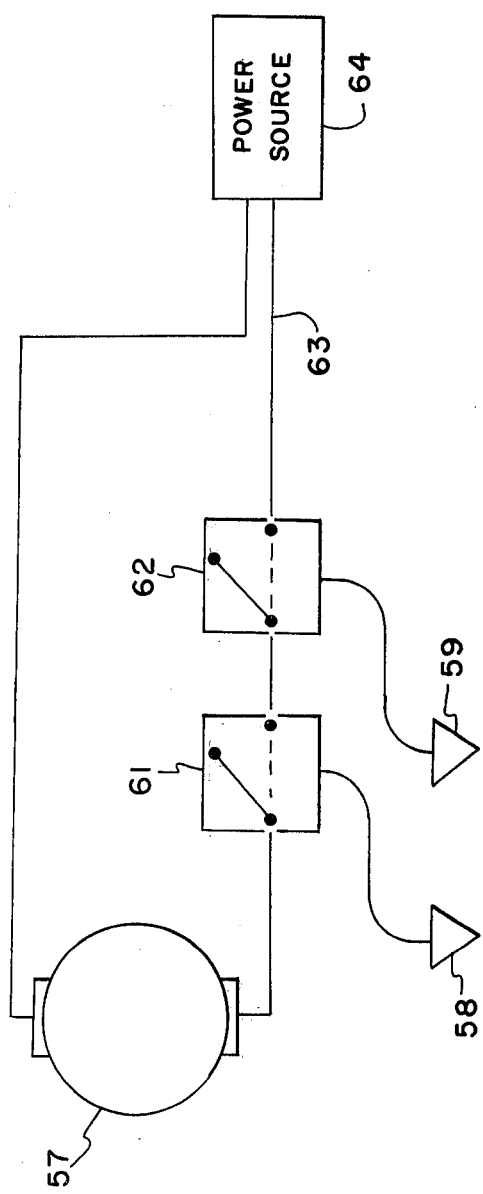
FIG. 3 is a schematic diagram of the pump power circuit of the alternate embodiment of FIG. 2.

The return of liquids from the auxiliary tank 50 is accomplished by activating suction pump 57 in return line 56. Suction pump activation is determined by the liquid level in settling tank 10 taken in conjunction with the liquid level in auxiliary tank 50 as determined respectively by sensors 58 and 59. Referring now to FIG. 3, it will be seen that a reduction in liquid level below outlet orifice 14 will result in activation of settling tank waste level sensor 58 causing switch 61 to close. Switch 62 will likewise be closed when the liquid level in auxiliary tank 50 is above sensor 59. Thus, power circuit 63 is complete causing pump 57 to remove liquid from auxiliary tank 50 through return line 56 and reintroduce the liquid into settling tank 10. Should liquid level again rise in settling tank 10 to the centerline of outlet orifice 15, level indicator 58 causes switch 61 to open thereby stopping liquid return by pump 57. Alternately, a reduction in liquid level in auxiliary tank 50 below sensor 59 activates switch 59 causing switch 62 to open resulting in deactivation of pump 57.

It is to be understood that the forms of the invention shown are merely preferred embodiments and various changes can be made in the shape, size and the arrangements of the parts as will be readily apparent to those skilled in the art. Also, equivalent means may be substituted for those described and certain features may be used independently from other features described herein without departing from the spirit and scope of the invention.

What is claimed as new and desired to be secured by Letters Patent of the United States is:

1. A septic system comprising:
    a settling tank having an inner floor, roof and wall forming a volume wherein sedimentation and anaerobic decomposition of effluent can occur;
    a drain field whereby liquid is absorbed from said septic system;
    an inlet pipe opening into the interior of said settling tank through said wall between said roof and said inner floor for communicating said liquid from an effluent source to said settling tank;
    an outlet pipe opening into the interior of said settling tank through said wall below said inlet pipe for communicating said liquid from said settling tank to said drain field;
    a barrier suspended from said settling tank roof extending below said inlet and outlet pipes to prevent floating effluent from communicating through said outlet pipe;
    means for controlling the liquid level in said settling tank, said controlling means including upper level regulating means to establish an upper liquid level, and lower level regulating means to establish a lower liquid level, said controlling means preventing effluent back up in said inlet pipe, preventing surface seepage at said drain field, and enabling more efficient anaerobic decomposition of said effluent.

2. The septic system of claim 1 wherein said controlling means comprises:
    a flexible bladder within said settling tank which when inflated displaces a portion of the volume within said tank otherwise containing said liquid; and
    means for deflating and inflating said flexible bladder to thereby change the portion of said settling tank volume occupied by said bladder to provide respectively more or less volume within said settling tank available for liquid processing and thereby limit liquid level therein.

3. The septic system of claim 2 wherein the means for deflating and inflating said flexible bladder comprises:
    an air compressor for providing pressurized air;
    an intake line between said air compressor and said bladder for injecting pressurized air to inflate said bladder and thereby displace a respectively larger liquid volume;
    a vent line attached to said bladder for air escape to deflate said bladder and thereby displace a respectively smaller liquid volume;
    a first valve means in said intake line for restricting pressurized air from entering said bladder when liquid in said septic tank rises to a predetermined level;
    a second valve means in said vent line for releasing pressurized air from said bladder when liquid in said septic tank rises to a predetermined level.

4. The septic system of claim 3 wherein said first valve means comprises:
    a ball float on the surface of said liquid connected by a level arm means to a gate contained in said intake line;
    said intake line further containing a seat positioned such that when the liquid level in said settling tank rises to a predetermined height said gate is sealed against said seat by the upward displacement of said ball float to prohibit further inflation of said bladder.

5. The septic system of claim 3 wherein said second valve means comprises:
    a ball float on the surface of said liquid connected by a lever arm means to a gate contained in said vent line; said vent line further containing a seat positioned such that when the liquid level in said settling tank rises to a predetermined height said gate is separated from said seat by the upward displacement of said ball float to allow air escape from said bladder.

6. The septic system of claim 1 wherein said controlling means comprises:
    a tank for storage of liquid communicated from said settling tank by a first connecting pipe passing through said settling tank wall a predetermined height above said outlet pipe; and return means whereby liquid is diverted into said storage tank when liquid level rises above a predetermined height in said settling tank then returned to said settling tank when said liquid level descends.

7. The septic system of claim 6 wherein said return means comprises:
    a second connecting pipe having openings at substantially the floor of said storage tank and at a level coplanar with said first connecting pipe in said settling tank;
    an electrically operated pump having a power line and attached to said connecting pipe for liquid communication; and
    sensing means for activating said pump when liquid is above a predetermined level in said storage tank and below a predetermined level in said settling tank.

8. The septic system of claim 7 wherein said sensing means comprises:
    a first pressure-type level sensor positioned in said settling tank adjacent said first connecting line;
    a second pressure-type level sensor positioned a predetermined height above said auxiliary tank floor;
    said first and second sensors connected respectively first and second switches in parallel in said pump power line such that said first switch is closed when the liquid level in said settling tank is below a predetermined height and said second switch is closed when liquid level in said storage tank is above a predetermined height thereby activating said pump.

9. The septic system of claim 4 wherein said first valve means comprises:
    a ball float on the surface of said liquid connected by a level arm means to a gate contained in said intake line;
    said intake line further containing a seat positioned such that when the liquid level in said settling tank falls below a predetermined height said gate is separated from said seat by the downward displacement of said ball float to permit further inflation of said bladder.

10. The septic system of claim 5 wherein said second valve means comprises:

a ball float on the surface of said liquid connected by a lever arm means to a gate contained in said vent line;

said vent line further containing a seat positioned such that when the liquid level in said settling tank falls below a predetermined height said gate is sealed against said seat by the downward displacement of said ball float to prohibit air escape from said bladder.

* * * * *